(12) United States Patent
Brette et al.

(10) Patent No.: US 8,290,947 B2
(45) Date of Patent: Oct. 16, 2012

(54) FEDERATED SEARCH

(75) Inventors: Marc Brette, Domene (FR);
Pierre-Yves Chevalier, Biviers (FR);
Alex Rankov, Danville, CA (US);
Victor Spivak, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/103,644

(22) Filed: May 9, 2011

(65) Prior Publication Data
US 2011/0208775 A1    Aug. 25, 2011

Related U.S. Application Data

(63) Continuation of application No. 11/393,217, filed on Mar. 30, 2006, now Pat. No. 7,962,464.

(51) Int. Cl.
*G06F 17/30* (2006.01)

(52) U.S. Cl. ......... 707/728; 707/713; 707/758; 707/769

(58) Field of Classification Search ............... 707/716, 707/723, 790; 705/5, 26, 65
See application file for complete search history.

(56) References Cited

U.S. PATENT DOCUMENTS

| | | | |
|---|---|---|---|
| 6,934,702 B2 * | 8/2005 | Faybishenko et al. | 707/749 |
| 6,961,723 B2 * | 11/2005 | Faybishenko et al. | 707/769 |
| 7,743,064 B2 * | 6/2010 | Faulkner et al. | 707/758 |
| 7,814,025 B2 * | 10/2010 | Roever et al. | 705/65 |
| 2003/0050927 A1 * | 3/2003 | Hussam | 707/723 |
| 2004/0122741 A1 * | 6/2004 | Sidman | 705/26 |
| 2004/0267700 A1 * | 12/2004 | Dumais et al. | 707/716 |
| 2006/0085462 A1 * | 4/2006 | Todd | 707/790 |
| 2006/0120353 A1 * | 6/2006 | Farrell et al. | 370/352 |
| 2008/0033770 A1 * | 2/2008 | Barth et al. | 705/5 |
| 2008/0228714 A1 * | 9/2008 | Prager et al. | 707/769 |

* cited by examiner

*Primary Examiner* — Shahid Alam
(74) *Attorney, Agent, or Firm* — Van Pelt, Yi & James LLP

(57) ABSTRACT

Federated search is disclosed. A result associated with a search of a content source not natively configured to provide content type data for content items is received. A content type is associated with a content item included in the result based at least in part on information associated with the result.

17 Claims, 5 Drawing Sheets

FEDERATED SEARCH

CROSS REFERENCE TO OTHER APPLICATIONS

This application is a continuation of co-pending U.S. patent application Ser. No. 11/393,217, entitled FEDERATED SEARCH filed Mar. 30, 2006 which is incorporated herein by reference for all purposes.

BACKGROUND OF THE INVENTION

Computer system users can access data from many sources including local data repositories, network attached data repositories, databases, and other resources (e.g., Internet websites). Some systems, for example content management systems, are able to provide search services for its users; these services enable users to identify documents containing a particular word, a particular phrase, a combination of words, related to particular data associated with content (e.g., metadata). However, this service is typically only available for the content and metadata that is internal to the search capable system (e.g., content that is managed by the content management system). In some cases, search is possible within other data sources, however only locally within systems or applications associated with the other sources. It would be beneficial to be able to take advantage of the search ability of a system for searching content or data that is either internal to the system, or also content or data that is not internal to the system.

BRIEF DESCRIPTION OF THE DRAWINGS

Various embodiments of the invention are disclosed in the following detailed description and the accompanying drawings.

DETAILED DESCRIPTION

Figure 1:
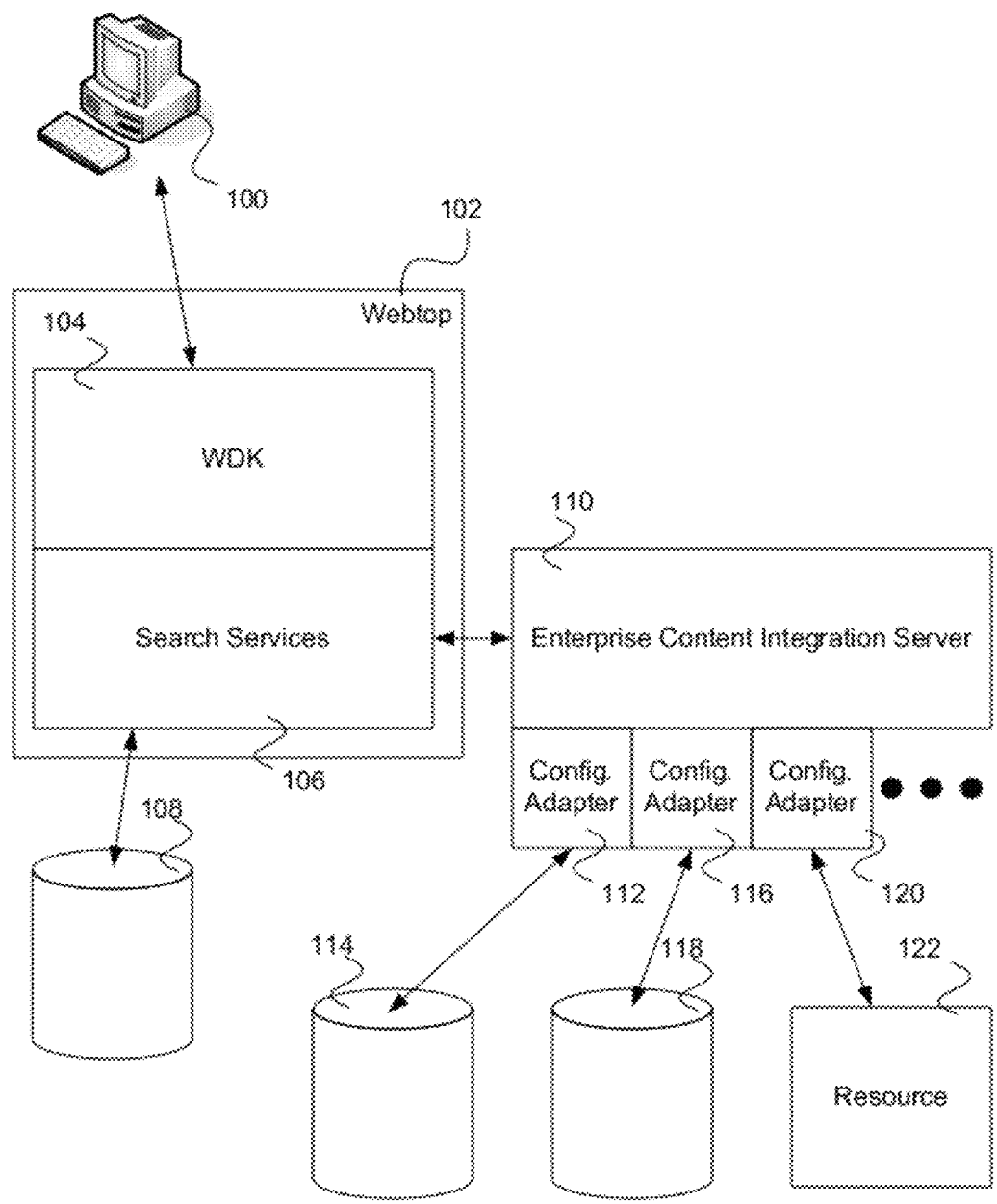
FIG. 1 is a block diagram illustrating an embodiment of a system for federated search.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Federated search is disclosed. A search is requested of a repository of a second system not natively organized by content item type from a first system that is organized by content item type. A search result and information associated with the search result are received. A type aware search result is created by adding type information to the search result based at least in part on the information associated with the search result. In some embodiments, the search is a desk top search tool that integrates searching of local sources as well as content management repositories, databases, other resources, etc. In some embodiments, the unified search does not require the requestor to know the repository/storage system's query language (e.g., a search for every document with "foo" for a system without full text search would receive a translated command that might include title contains "foo" or text contains "foo"). In some embodiments, type data is associated with a content source or portion thereof and the type data is associated with a content item associated with (e.g., retrieved from and/or identified in the course of a search of) the content source or portion thereof. In some embodiments, a content item not stored in the internal repository but found in response to query performed via the internal repository and/or an associated content management system can be migrated to the internal repository with an automatic capture of type information during the migration. In some embodiments, authentication is required for a given external repository or resource, and a user is prompted for authentication information (e.g., username and password, security token, etc.) as required when a session is initiated. When the search results are accessed again, the authentication information as well as path or access information is recalled from the prior search so that the results are requested again and/or access is provided without the user having to re-authenticate the session or recall the sequence of the search in order to locate the desired information (e.g., search results often provide a temporary path to requested information and in this case the federated search system provides in a manner transparent to the user the ability to re-access the information without the concern that a temporary path may have expired).

FIG. 1 is a block diagram illustrating an embodiment of a system for federated search. In the example shown, one or more users connect to web-based content management application 102 using a computer system, represented in FIG. 1 by computer 100. In the example shown, web-based content management application 102 is built on a content management system vendor-provided web development kit (WDK) 104. In some embodiments, WDK 104 comprises a set of tools to facilitate development of web-based applications, e.g., by providing reusable components pre-configured to interact with a content server and/or other repository to provide content management services. Web-based content management application 102 in some embodiments provides to users content type aware content management services and/or functions. An example of a content type aware service or function is providing a view (display) based at least in part on content item type, e.g., displaying a "calendar" as a grid and an email message with "to", "from", "subject", and/or other fields in a header display region at the top of the display, attachment names/icons in an attachment display region below the header, and message text in a message body display region at the bottom; enabling a user to search by content type; and displaying query results in a manner determined based at least in part on content type. Web-based content management application 102 also includes search services 106. In some embodiments, a user requests a search to a content management system. The content management service searches both the internal repositories of the content management system and external repositories and other attached resources. The content management system receives the search request and the WDK 104 translates the search request for search services 106. Search services 106 translates the search request for a direct search of internal content management system repository 108 and an indirect search of external repositories/resources via enterprise content integration server 110. In some embodiments, search services 106 are provided by business logic and/or foundation classes that comprise a content management framework on which web-based content management application 102 and WDK 104 are based. Enterprise content integration (ECI) server 110 targets the search request for a search of one or more external repositories, represented in FIG. 1 by 114 and 118, and/or other resources, represented in FIG. 1 by 122. In various embodiments, external repositories comprise other content management systems, database systems, legacy content management systems not capable of the type of search desired, (e.g., Filenet™, LexisNexis™, Lotus Notes™, etc.). In various embodiments, other resources include information sources or search services—for example, Google™, Yahoo™, MSN™, MySimon™, Pricewatch™, AskJeeves™, etc. The targeted search request is translated and adapted using a configuration adapter, represented in FIG. 1 by configuration adapter 112, 116, and 120. The configuration adapter also translates and adapts the responses to the search request and passes the responses to ECI server 110. In some embodiments, the configuration adapter includes associated information in the response to the search request. In some embodiments, the associated information is ultimately used as metadata information that enables the content management system to treat the search results as typed information for the results of the search. In some embodiments, a query broker (not shown) at the content management system is configured to communicate with the ECI server 110 and to use information about the external content sources accessed via ECI server 110 to associate type information with results received from ECI server 110. The results from ECI server 110 in some embodiments indicate the external content source for each responsive content item (or group of items), and the query broker at the content management system associates type information with each content item (or set of content items) based on the source, as identified for example by data associated with a configuration file and/or adapter used to retrieve and/or identify the content from the external source. In some embodiments, more than one configuration adapter is associated with a specific repository or resource—for example, one configuration adapter is configured to facilitate searching for contract information in a specific database and another configuration adapter is configured to facilitate searching for financial information or specification information in the same specific database. In some embodiments, a configuration adapter is easily configured by a user, system administrator, system manager using an application with a graphical user interface (e.g., a WYSIWYG editor) to establish general parsing and syntax rules for communication between the ECI server and the external repository or resource. In various embodiments, the configuration adapter configuration is based on preconfigured templates, has a self learning engine in order to self-configure based at least in part on the external repository type and/or external resource type.

Figure 2:
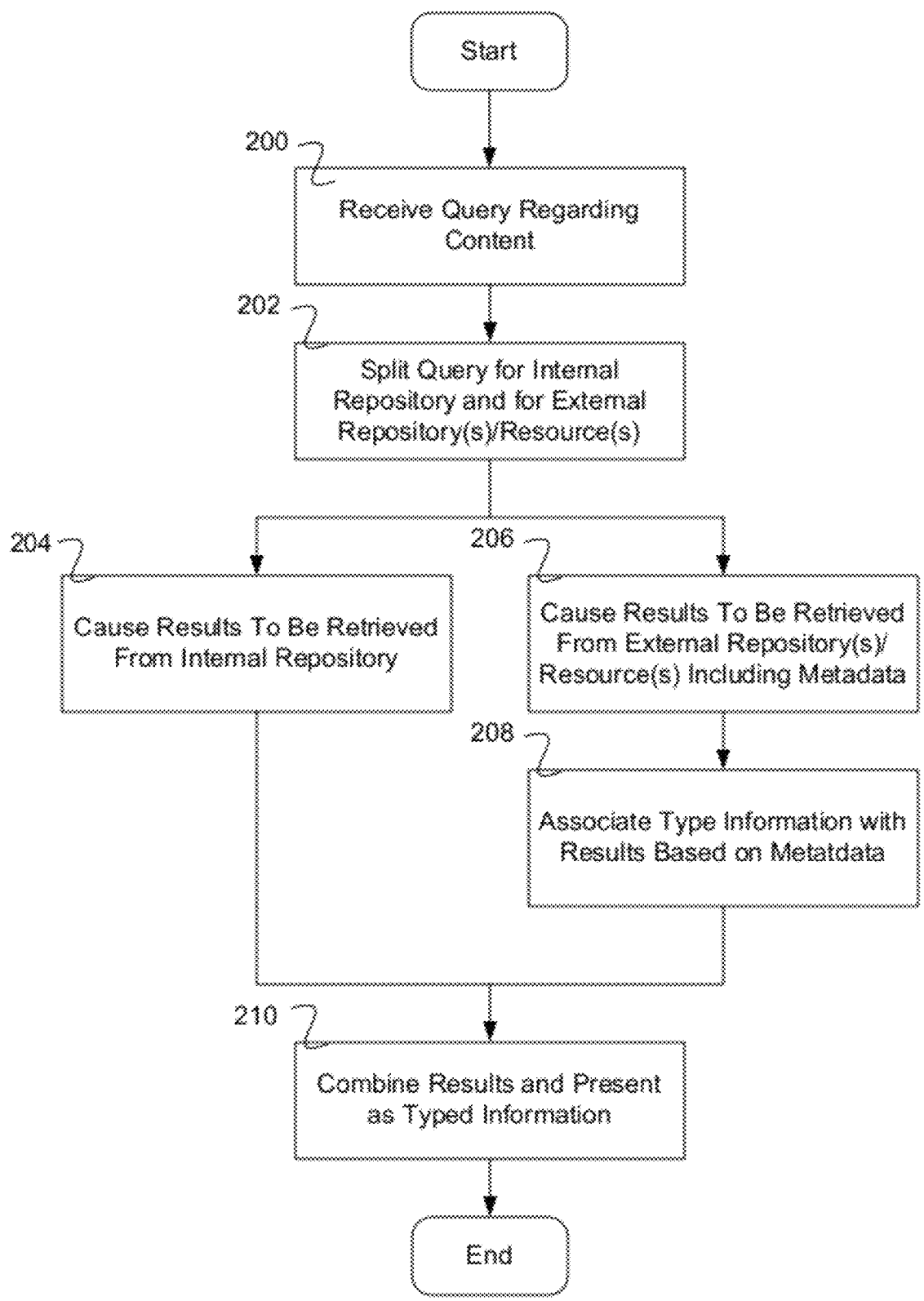
FIG. 2 is a flow diagram illustrating an embodiment of a process for a federated search.

FIG. 2 is a flow diagram illustrating an embodiment of a process for a federated search. In various embodiments, the process of FIG. 2 is executed at least in part in web-based content management application 102, WDK 104, and/or search services 106 of FIG. 1. In the example shown, in 200 a query is received regarding content. In some embodiments, the query requests information regarding the content using type information—for example, a request is made to locate all contracts associated with a company name. In 202, the query is split for the internal repository and for external repository(s) and/or external resource(s). In some embodiments, the query is translated from a user request to a request that can be understood by search services (e.g., WDK 104 translates the query for search services 106—for example, a universal search syntax/language such as DFC). In some embodiments, search services 106 translates the query so that the query is appropriate for the internal repository and the federated search broker, which interacts through configuration adapters, with external repository(s) and external resource(s). In some embodiments, the translation comprises the generation of a more general and degraded query that can be processed by the external repository. The translation can compensate for a lack of sophistication of the target systems and can be combined with a post-filtering step to ensure the correctness of the results. In 204, the results are caused to be retrieved from the internal repository. In some embodiments, the translated query for the internal repository (e.g., a proprietary query language for the internal repository or an API call) is caused to execute and the results are received from the internal repository which natively understands typed information. In 206, the results are caused to be retrieved from external repository(s) and other external resource(s), as applicable, including the retrieval of metadata regarding the results. In some embodiments, the translated query for the external repository(s) and/or external resource(s) (e.g., a syntax that conforms to an API or other interface or language associated with enterprise content integration (ECI) server 110) is caused to execute and the results are received from external repository(s) and/or resource(s) which do not natively understand type information. In 208, type information is associated with the results based at least in part on the metadata. In some embodiments, type information is associated with the results based on metadata information received along with results. In some embodiments, a configuration adapter that is configured, on the one hand, to adapt search queries for an external repository or external resource from an ECI server, and, on the other hand, to adapt search query results from an external repository or external resource to an ECI server including adding, querying for, and/or generating appropriate associated metadata for the query results. In some embodiments, the type information does not accompany the search results and instead is learned prior to and/or subsequent to the search being performed and/or results returned. In some embodiments, 206 and 208 are performed by a federated query broker at the content management system, configured to translate queries into a language and/or format understood by the ECI server 110 and to translate results from ECI server 110 into a form and format understood and usable at the content management system. In some embodiments, the functions of the federated query broker as described in the preceding sentence are performed by a broker on ECI server 110 and/or integrated into the functionality of ECI server 110. For example, in some embodiments the ECI server 110 is configured to use information associated with an external content source, e.g., a configuration adapter and/or associated configuration file associated with the external content source, to associate type information with content items responsive to a query, e.g., by injecting content type data (e.g., metadata) as appropriate in a stream of results data sent to the content management system from which a federated query was received. In some embodiments, results received from external sources are post-filtered to check and/or ensure that the results are relevant to and/or valid for the original query as expressed in 200. Post-filtering can be important in the event that the original query is translated in such a manner as to make the query more general or if the specificity of the query has been degraded. In 210, the results from the internal repository and external repository(s) and external resource(s) are combined and presented as typed information. In some embodiments, transparent to a requesting user, combined search results from the internal repository and external repository(s) and/or external resource(s) are presented to a user in a content type aware manner as a single/integrated set of results. In some embodiments, the results are deduplicated (i.e., results indicating identical content items are reduced to one result) using one or more of the following: a unique identifier or a characteristic attribute such as size, date of creation, type, last modification date, etc. In various embodiments, the search results from the internal repository, the search results from the external repository(s), the results from the external resource(s), or any combination are deduplicated. In some embodiments, content data or result data are translated from a native format associated with the external content source into a common format associated with the content management system (e.g., XML, text, etc.). In some embodiments, content data or result data are not translated from a native format associated with the external content source (e.g., Microsoft Word™ format, Adobe PDF™ format, etc.).

Figure 3:
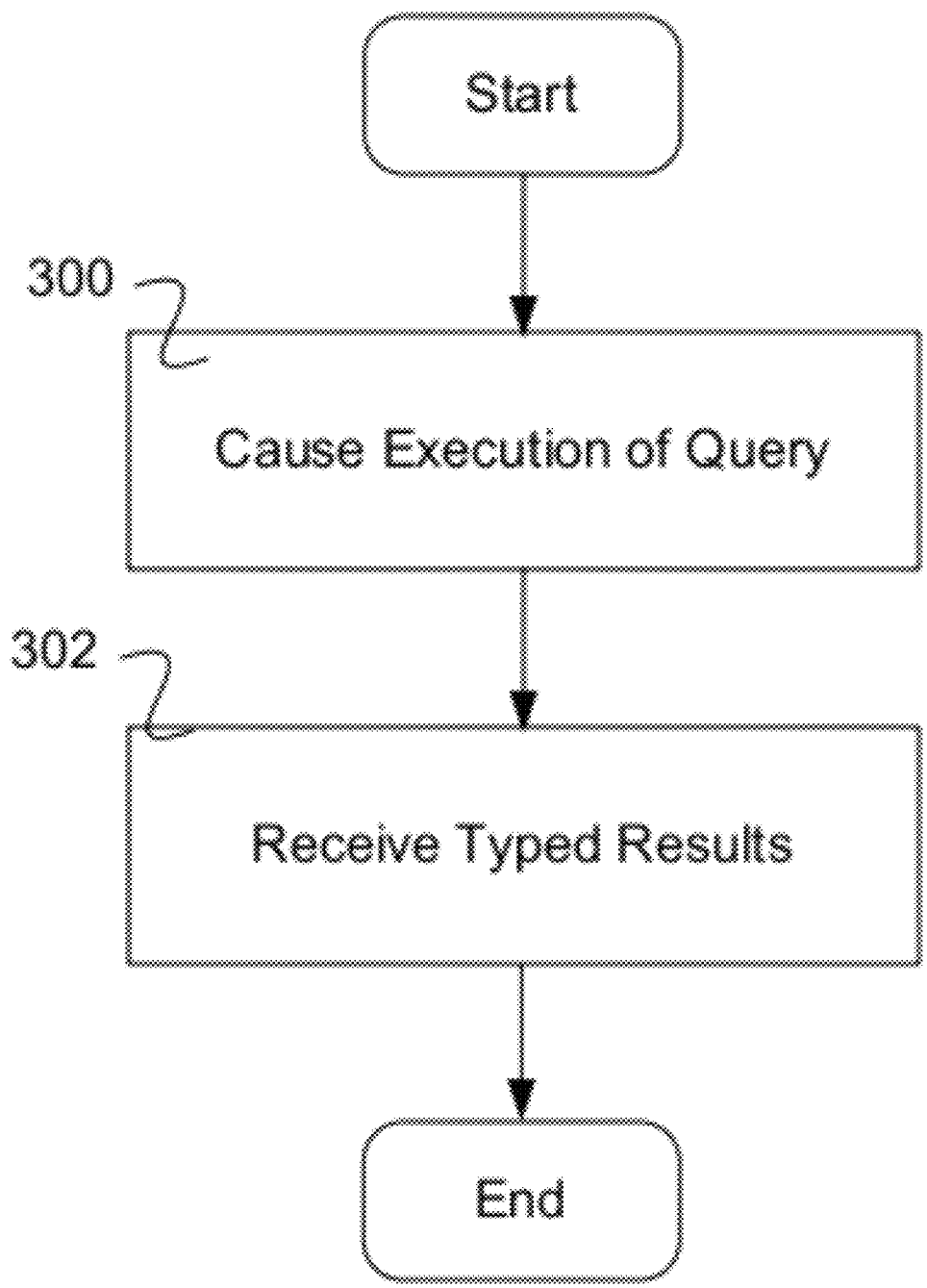
FIG. 3 is a flow diagram illustrating an embodiment of a process for causing results to be retrieved from the internal repository.

FIG. 3 is a flow diagram illustrating an embodiment of a process for causing results to be retrieved from the internal repository. In some embodiments, the process of FIG. 3 is used to implement 206 of FIG. 2. In the example shown, in 300 the query is caused to be executed. In some embodiments, the search service of a content management system which natively understands typed information is used to perform a search of the internal repository by causing a query to be executed by the repository. In 302, typed results are received. The results from the internal repository can include information regarding content type—for example, information arising from associated metadata information with respect to a specific content item.

Figure 4:
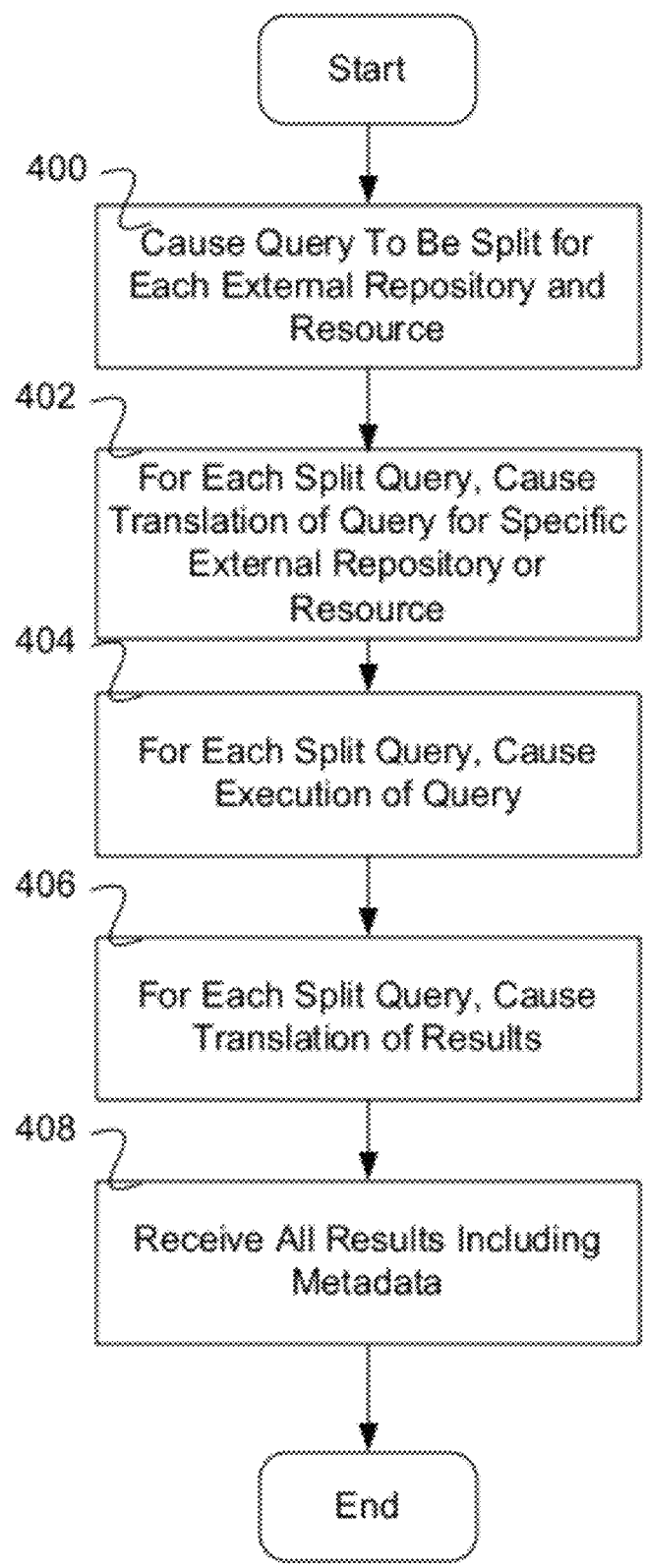
FIG. 4 is a flow diagram illustrating a process for causing results to be retrieved from external repository(s) and external resource(s) including the retrieval of metadata regarding the results.

FIG. 4 is a flow diagram illustrating a process for causing results to be retrieved from external repository(s) and external resource(s) including the retrieval of metadata regarding the results. In some embodiments, the process of FIG. 4 is used to implement 208 of FIG. 2. In the example shown, in 400 the query is caused to be split for each external repository and/or external resource. In some embodiments, the search is performed only with respect to a subset of external content sources accessible via the ECI server, such as only those external content sources that include content of a content type identified in the query. In some embodiments, the ECI server determines which external sources to search, e.g., based on one or more search terms (e.g., content type). In some embodiments, a broker at the content management system determines which external sources to search and identifies to the ECI server the external content sources to be searched for a particular query. In some embodiments, authentication is required for a given external repository or resource, and a user is prompted for authentication information as required when a session is initiated. When the search results are accessed again, the authentication information as well as path or access information is recalled from the prior search so that the results are presented again or access is provided without the user having to re-authenticate the session or recall the sequence of the search in order to locate the desired information. In 402, for each external repository and/or resource, a translation of the query is caused for the specific external repository or resource. In some embodiments, a configuration adapter is configured to translate the query for a specific repository or resource. In 404, for each split query, the query is caused to be executed. In 406, for each split query, the results are caused to be translated. In 408, all results from each of the split queries are received including metadata. In some embodiments, the metadata is a collection of attribute data from the external repository or resource associated with the search result. In some embodiments, the search result is translated appropriately for the ECI server and the search service.

Figure 5:
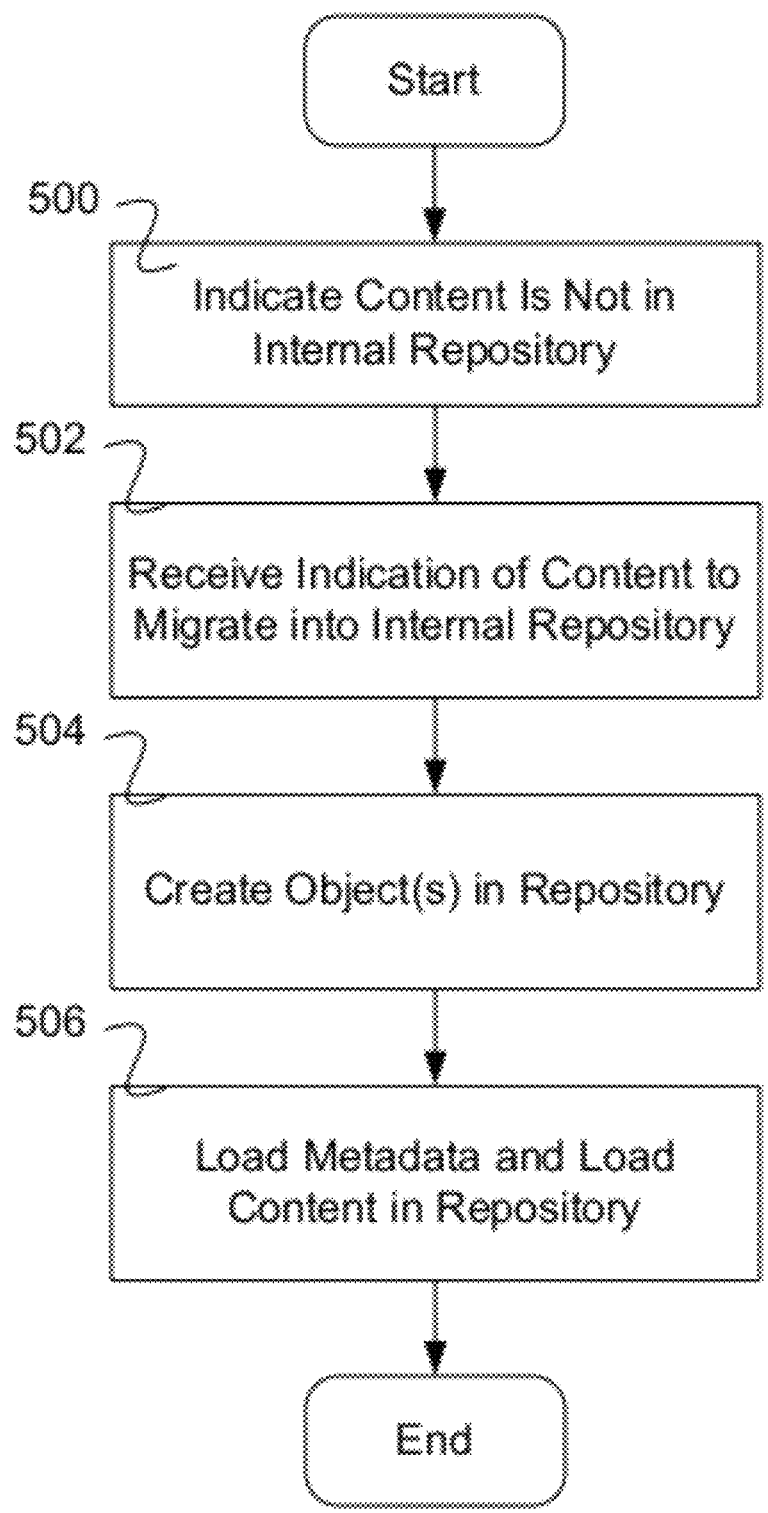
FIG. 5 is a flow diagram illustrating an embodiment of a process for migrating content on demand.

FIG. 5 is a flow diagram illustrating an embodiment of a process for migrating content on demand. In some embodiments, the process of FIG. 5 follows the process of FIG. 2. Federated search results if not a part of the internal repository can be migrated into the internal repository and stored as typed content with associated metadata. In the example shown, in 500 content is indicated as being not in the internal repository. In some embodiments, the results of the federated search are presented to the search requestor in a manner that indicates that the search result is from an external repository or resource—for example, displayed in a different color (e.g., different from the color used to display a search result from the internal repository), with a different background (e.g., different from the background used to display a search result from the internal repository), with an additional or different icon (e.g., different from the icon used to display a search result from the internal repository), in a separate result window, in a separate list, or by any other appropriate manner of indicating. In 502, an indication is received of the content items that are to be migrated into the internal repository. In various embodiments, the indication comprises a selection of items in a list by highlighting in a list, clicking radio buttons, checking boxes, typing in a text window, or any other appropriate manner of indicating. In various embodiments, the one or more content items are retrieved along with associated metadata in order to be able to load the content item and associated metadata into the internal database so that content is appropriately type or the content items and associated metadata are already loaded in such a manner as to enable loading the content item and associated metadata into the internal database. In 504, object(s) are created in the repository, e.g., one or more persistent objects each configured to represent a corresponding content item in the repository, e.g., by storing metadata about the content item and/or making available one or more methods for accessing and/or managing the content item. In some embodiments, an object is created for each content item to be migrated. In some embodiments, the content items are checked to ensure that there are no duplicates being stored in the repository including checking for duplicates in the new information and/or checking to see if the new information duplicates any previously stored information. In various embodiments, checking for duplicates comprises checking a file size, checking a file creation or modification date, checking a checksum, checking an attribute, or any other appropriate manner of checking to see if a content item is a duplicate. In 506, metadata is loaded (e.g., by populating attributes of the object(s) created at 504) and content is stored in the repository. In some embodiments, the metadata includes content type information derived from metadata associated with the content item, content data comprising the content item, and/or type information associated with and/or received from a configuration adapter and/or file associated with the external content source from which the content item was imported. In some embodiments, metadata and/or a portion thereof is displayed to a user for verification and/or editing prior to saving the object to the repository, e.g., to permit a user to correct an error in mapping content item metadata received from and/or associated with the external source—e.g., content type—to attributes of the object being configured to represent the content item in the local repository. In some embodiments, the search result, session authentication information, temporary path information (e.g., a URL from an external resource search—for example, a Google™ search result URL) is stored as metadata associated with a content item.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing content comprising:
A processor configured to:
   receive at a content management system that is organized by content item type a search query using a content type data to request one or more content items;
   split the search query into a first split search query and a second split search query;
   cause the first split search query to search an internal repository, wherein the internal repository is organized by content item type;
   cause the second split search query to search in an external content source, wherein the external content source is not natively configured to provide content type data for content items;
   receive a first result associated with the first split search query of the internal repository;
   receive at the content management system a second result associated with the second split search query of the external content source;
   associate a content type with a content item included in the second result based at least in part on an information associated with the second result;
   combine the first result and the second result at a time subsequent to associating the content type with the content item included in the second result;
   provide the combined results; and
a memory coupled to the processor and configured to provide the processor with instructions.

2. A system as in claim 1, wherein the processor is further configured to receive the information associated with the second result associated with the second split search query of the external content source.

3. A system as in claim 1, wherein the information associated with the second result associated with the second split search query of the external content source includes metadata associated with the content item.

4. A system as in claim 1, the information associated with the second result associated with the second split search query of the external content source includes information about the content source.

5. A system as in claim 1, the information associated with the second result associated with the second split search query of the external content source includes information associating the content type with the content source.

6. A system as in claim 1, wherein the internal repository comprises a content management system and the external content source comprises an external source of content that is external to the content management system.

7. A system as in claim 1, wherein the external content source comprises one of the following: a content management system, a database system, a legacy content management system, an information source system, or a search services system.

8. A system as in claim 1, wherein causing the first split search query to search an internal repository includes translating the request into a form associated with the internal repository.

9. A system as in claim 1, wherein causing the second split search query to search in an external content source includes translating the request into a form associated with the external content source.

10. A system as in claim 9, wherein the request comprises a more general request.

11. A system as in claim 10, wherein receiving the second result associated with the second split search query of the external content source includes post-filtering the second result to check that the results are relevant to the requested search of the content source.

12. A system as in claim 1, wherein causing the second split search query to search in the external content source includes providing authentication information to the external content source.

13. A system as in claim 1, wherein receiving the second result associated with the second split search query of the external content source includes translating the second result into a form associated with the content management system with respect to which the external content source comprises an external source.

14. A system as in claim 1, wherein the second result associated with the second split search query of the external content source includes information enabling the second result associated with the second split search query of the external content source to be obtained again from the external content source.

15. A system as in claim 1, wherein receiving the second result associated with the second split search query of the external content source includes one or more of the following: adding, querying for, or generating the information associated with the second result.

16. A computer program product for managing content, the computer program product being embodied in a non-transitory computer readable storage medium and comprising computer instructions for:
   receiving at a content management system that is organized by content item type a search query using a content type data to request one or more content items;
   splitting the search query into a first split search query and a second split search query;
   causing the first split search query to search an internal repository, wherein the internal repository is organized by content item type;

causing the second split search query to search in an external content source that is not natively configured to provide content type data for content items;
receiving a first result associated with the first split search query of the internal repository;
receiving at the content management system a second result associated with the second split search query of the external content source;
associating a content type with a content item included in the second result based at least in part on an information associated with the second result;
combining the first result and the second result at a time subsequent to associating the content type with the content item included in the second result; and
providing the combined results.

17. A method for managing content comprising:
receiving at a content management system that is organized by content item type a search query using a content type data to request one or more content items;
splitting the search query into a first split search query and a second split search query;
causing the first split search query to search an internal repository, wherein the internal repository is organized by content item type;
causing the second split search query to search in an external content source that is not natively configured to provide content type data for content items;
receiving a first result associated with the first split search query of the internal repository;
receiving at the content management system a second result associated with the second split search query of the external content source;
associating a content type with a content item included in the second result based at least in part on an information associated with the second result;
combining the first result and the second result at a time subsequent to associating the content type with the content item included in the second result; and
providing the combined results.

* * * * *